United States Patent

[11] 3,568,833

[72] Inventor  Henricus S. H. Ritzen
              Rijswijk, Netherlands
[21] Appl. No. 769,067
[22] Filed     Oct. 21, 1968
[45] Patented  Mar. 9, 1971
[73] Assignee  Machinenfabrick Reineveld N.V.
               Delft, Netherlands
[32] Priority  Oct. 19, 1967
[33]           Netherlands
[31]           67.14199

[54] ION EXCHANGE METHOD AND APPARATUS
     4 Claims, 2 Drawing Figs.
[52] U.S. Cl. .................................................. 210/35,
                                                              210/340
[51] Int. Cl. ............................................... B01d 15/04
[50] Field of Search ........................................ 210/20, 32,
                                                              35, 264

[56]                 References Cited
                 UNITED STATES PATENTS
3,154,484  10/1964  Stoner ...................... 210/35
3,386,914   6/1968  Hunter ...................... 210/35
3,441,503   4/1969  Smith ....................... 210/35
                  FOREIGN PATENTS
  230,587   6/1960  Australia ................... 210/35
  315,117   7/1956  Switzerland ................. 210/20

Primary Examiner—Samih N. Zaharna
Attorney—Snyder and Butrum

ABSTRACT: A method of continuously treating a liquid with an ion exchanger material contained in vessels being alternately in service by providing in each vessel an amount of ion exchanger material being in small excess as compared with the required amount for treating the volume of liquid that has to be treated during the time required for regenerating and washing a corresponding amount of ion exchanger material.

INVENTOR
HENRICUS S. H. RITZEN

ION EXCHANGE METHOD AND APPARATUS

FIELD OF THE INVENTION

The invention relates to the treatment of liquids with ion exchanger material and has for an object a restriction of the amount of ion exchanger material required for treating a given volume of liquid per unit of time.

DESCRIPTION OF THE PRIOR ART

The method of continuously treating a liquid comprising unwanted ions to be substituted by other ions is generally based upon alternately passing said liquid through one bed of ion exchanger material while regenerating a second bed of ion exchanger material and changing about the said beds after the first one has been exhausted. Then the procedure can be repeated.

For some reasons such as preventing channel formation and obtaining a full exchange "static" beds are preferred. The term "static" bed is meant to define a bed of particulate material remaining in one and the same vessel without substantial changes in the relative positions of the particles.

A similar method is commonly known and is disclosed in French Pat. No. 1,480,503, though presents the drawback that the lapse of time during which a bed of ion exchanger material is used for treating the liquid is several times longer than the lapse of time for regenerating and washing a similar bed. The latter lapse of time has for each ion exchanger material a certain minimum value, normal in the order of 1 hour, which value is almost independent from the amount of said material. However, the lapse of time during which said material can be used for the treatment of the liquid is almost proportional to the amount of ion exchanger material forming a bed. The latter amount is calculated on the basis of the specifications provided by the manufacturer of the said material and is further determined by the demand that the bed height ought to be larger than the mean bed diameter. The period of time during which the bed is active now is fixed and is generally some time in excess of the reconditioning time, the flowrate, the liquid, and the concentration of ions to be removed being given.

Accordingly one-half of the total amount of ion exchanger material is out of service during the difference between the said periods of time incurring a greater investment and larger dimensions that would be the case if the total amount of ion exchanger material would be continuously in service.

The present invention enables the amount of ion exchanger material to be restricted contrary to the specifications of the manufacturers.

SUMMARY OF THE INVENTION

The treatment of liquids with ion exchanger material additionally involves the reconditioning treatment of the said material. As however, the periods of time required of the respective treatments normally are greatly different a part of said material is out of service for some period of time.

In comparison with these prior art procedures the invention provides a simple yet effective method of continuously treating a liquid with an ion exchanger material by passing the liquid through a first vessel comprising a first static bed of particulate ion exchanger material and simultaneously regenerating and subsequently washing a similar second bed of ion exchanger material used for the said treatment in a second vessel and by passing after a certain lapse of time the liquid to be treated through the second bed and regenerating and washing the first bed.

In accordance with one form of the present invention there is provided a similar method of treating liquids having the features that the amount of ion exchanger material in each of the beds is in small excess of the amount as required for treating the amount of liquid to be treated during the regenerating and washing treatment and that the liquid to be treated is passed upwardly through the bed with such a fast flow rate that the closely packed bed is lifted into the upper part of the respective vessel.

A preferred form of reconditioning is passing the regenerating liquid and the washing liquid at a slow rate of flow downwardly through the bed to be reconditioned. Preferably the washing liquid for the one bed is a part of the liquid treated in the other bed.

In order to prevent channel formation in the bed of ion exchanger material, that would give rise to imperfect treatment of the liquid, it is preferred to choose the bed height large as compared to the mean diameter of said bed.

The apparatus for putting into practice the above-mentioned method comprising a pair of vessels in connection with a service system, a source of raw liquid supply under pressure, a drain for treat liquid, a waste liquid conduit and a source of regenerating liquid, each vessel containing a bed of ion exchanger material. conduits connected to the lower portions of said vessels for feeding liquid to be treated into said vessels alternately, outlet conduits connected to the upper portions of said vessels for receiving treated liquid, conduits connected to the upper portions of said vessels for feeding regenerating liquid into said vessels alternately and outlet conduits connected to the lower portions of said vessels for draining used regenerating liquid and washing liquid, the upper portions of said vessels being interconnected by means of an interconnecting conduit having a controllable valve means.

For a smooth and simple performance each of the outlet conduits for treated liquid comprises a check valve while the interconnection conduit for washing liquid being connected to the conduit sections between the check valves and the upper portions of the vessels. The regenerating liquid may be fed through feeding conduits each having a check valve and each debouching in the said conduit sections.

The inventive method presents the advantage that the reconditioned bed is not left out of service for a long period of time though almost immediately after the reconditioning treatment is reused for the liquid treatment such as to make a very intensive use of the ion exchanger material.

In addition thereto the invented method shows the feature that the period of time during which the ion exchanger material is in contact with the liquid to be treated is relatively short. Accordingly big molecules possibly existing in the liquid to be treated cannot diffuse over a rather long distance into the ion exchanger material and may be easily discarded during the reconditioning treatment that takes about as much time as the liquid treatment.

For further objects and advantages of the invention and for a more detailed description thereof, reference is had to the following description taken in conjunction with the accompanying drawings.

DETAILED DESCRIPTION

Figure 1:
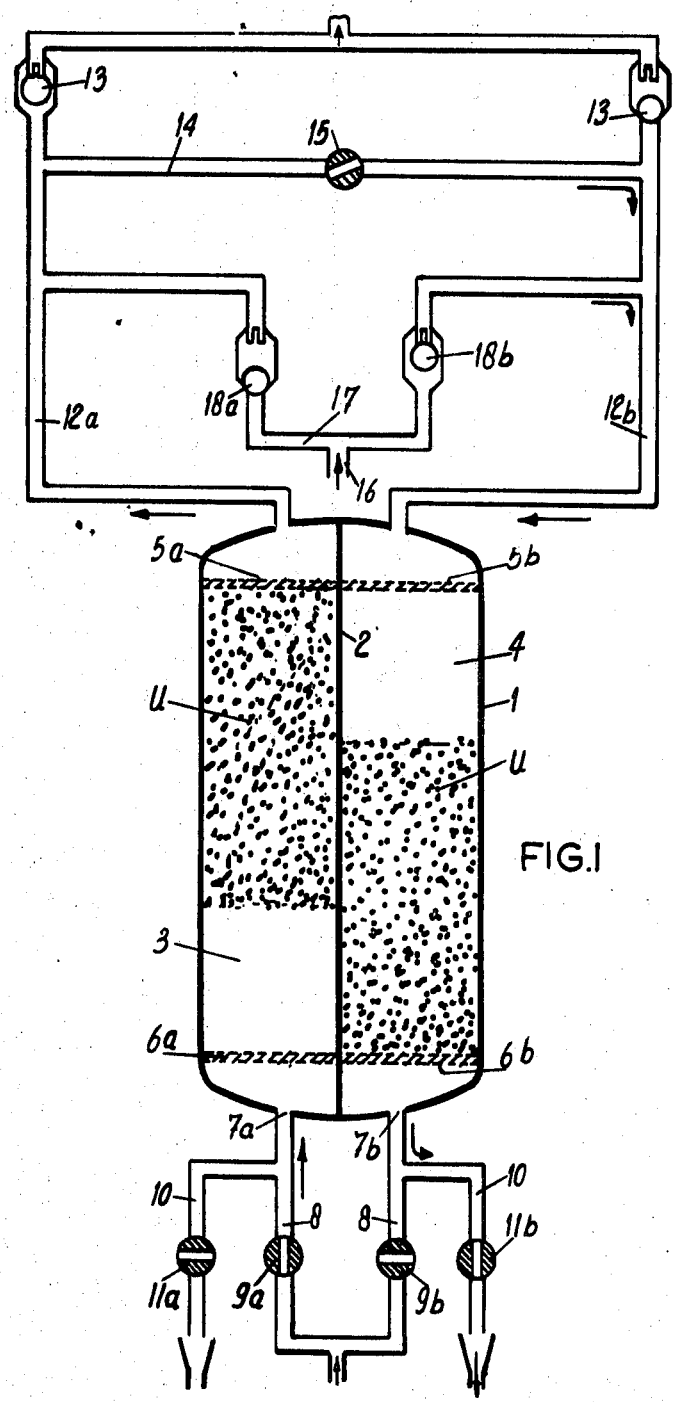
FIG. 1 is one preferred diagrammatical view of an embodiment of the device for performing the method of the invention.

Referring to FIG. 1 there is shown a vertical vessel being subdivided by means of a separation wall 2 into two similar compartments 3, 4.

The compartment 3 comprises in its upper part a distributor plate $5a$ and near its lower part a distributor plate $6a$ which plates allow the passage of liquid though not of particulate ion exchanger. The compartment 4 similarly comprises liquid-permeable means $5b$, $6b$. The space defined by the said means is partly filled with a particulate ion exchanger material $U$.

In the lower portion of both compartments 3 and 4 conduits 8 for feeding raw liquid to be treated debouch at $7a$ and $7b$ respectively, the said conduits each comprising a valve means $9a$ and $9b$ respectively. Each conduit 8 has a branch conduit 10 each comprising a valve means $11a$ and $11b$ respectively for draining used regenerating liquid and washing liquid.

Outlet conduits 12a and 12b respectively for removing treated liquid are connected to the upper portion of the said compartments 3 and 4, each of the conduits being provided with check valves 13. The sections of said outlet conduits between the upper portions of the compartments and the check valves are interconnected by means of a conduit 14 comprising a controllable valve means 15.

The regenerating liquid is fed from a suitable source through a pipe 16 having two branches 17 each comprising a check valve 18a and 18b respectively and debouching in the conduit sections 12a and 12b, respectively.

The control of the valve means 9a, 9b, 11a and 11b may proceed by means of a programmed controlling device (not shown) receiving its pulse from a suitable measuring apparatus (not shown) such as for measuring the hardness of water, the volume of treated liquid, the conductivity or the pH-value.

The valve means being positioned as shown in FIG. 1 then the liquid flow is as follows: raw liquid is fed through the conduit 8, the valve means 9a into the lower part of compartment 3 and will react with the ion exchanger material U. The dimensions of the compartment 3 and the flow rate of the liquid are predetermined in such a manner as to cause the lifting of the bed ion exchanger material into the upper part of the compartment in a rather closely packed condition. By proceeding in such a manner a fluidized bed is prevented which would adversely affect the operation. The bed is prevented from leaving the compartment 3 by means of a seeve means 5a. The treated liquid is discharged through the conduit 12a and the check valve in the direction of the arrow. A small amount of said liquid will be fed back through the conduit 14 and the control valve 15 to the upper part of the compartment 4 and leave said compartment by the conduit 10 and the valve means 11b.

The regenerating liquid fed through the conduit 16 flows at a slow rate through the conduit 17 past the opened check valve 18b and through the conduit 12b into the compartment 4. By said flow and under influence of gravity forces the bed in compartment 4 is forced downwardly and is prevented from leaving said compartment by the seeve means 6b. The regenerating liquid reacts with the ion exchanger material and the used liquid leaves the compartment 4 through the conduit 10 comprising the now opened valve means 11b as does the washing liquid.

After being reconditioned the said bed is used for treating the raw liquid and the bed now coming out of use is reconditioned. To that end the control apparatus closes the valve means 9a and 11b and opens the valve means 9b and 11a. Said opening and closing proceeds simultaneously so an uninterrupted flow of treated liquid is obtained.

Figure 2:
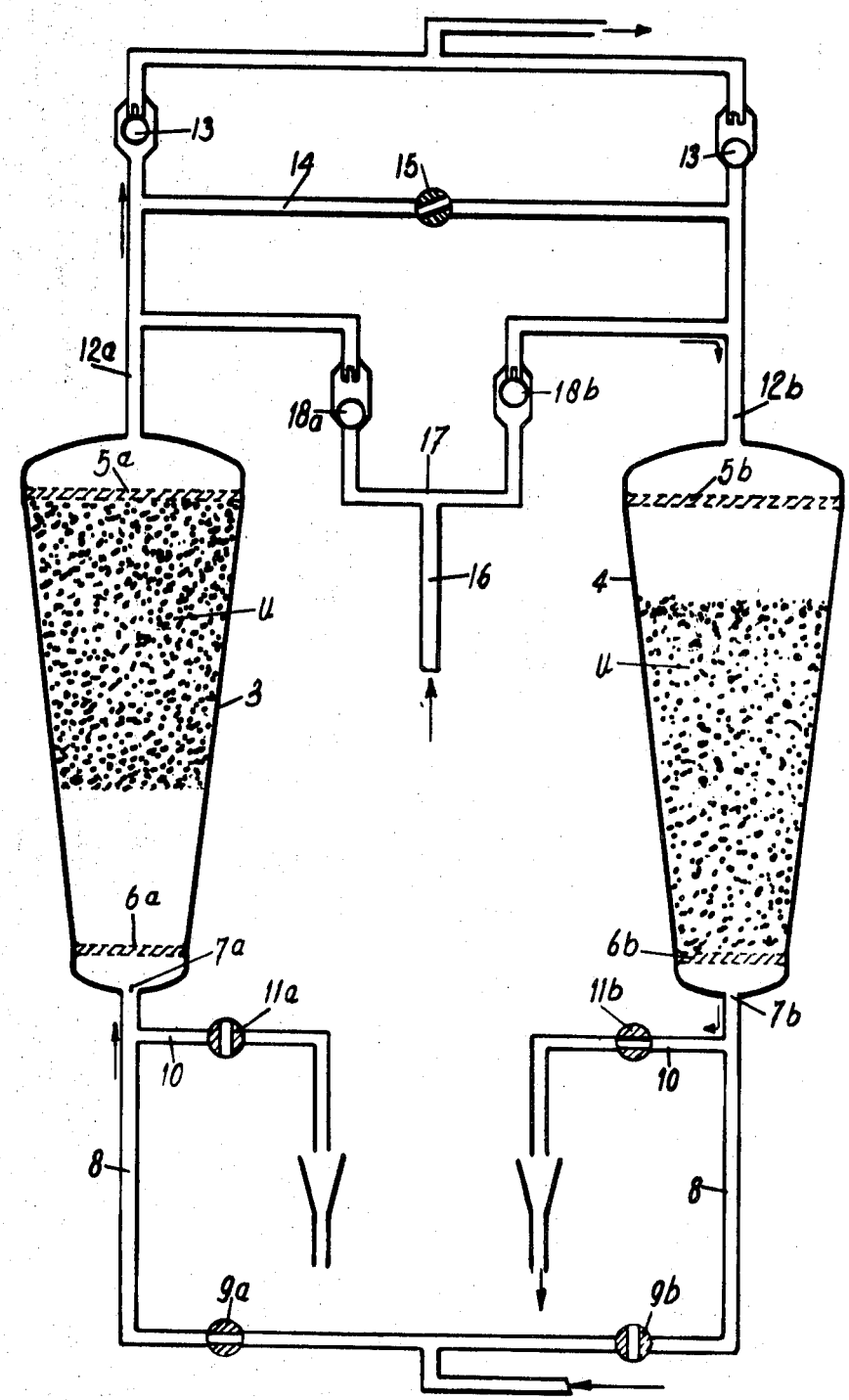
FIG. 2 is a similar view of a second preferred embodiment especially for large capacity apparatuses.

The embodiment of FIG. 2 in principle conforms to that of FIG. 1 with the only differences that the beds are contained in separate vessels, said vessels having a frustoconical shape. This embodiment is meant for big capacity plants, the shape of the vessels being adapted to the most favorable flow pattern.

While some preferred embodiments of this invention have been shown and described, it is to be understood that the invention is not limited thereto and that various modifications can be made thereto without departing from the spirit and scope as defined in the appended claims.

I claim:

1. A method of continuously treating a liquid with an ion exchanger material by passing the liquid through a first vessel comprising a first static bed of particulate ion exchanger material and simultaneously regenerating and subsequently washing a similar second bed of ion exchanger material used for the said treatment in a second vessel and by passing after a certain lapse of time the liquid to be treated through the second bed and regenerating and washing the first bed characterized in that the amount of ion exchanger material in each of the beds is in small excess of the amount as required for treating the amount of liquid to be treated during the regenerating and washing treatment and in that the liquid to be treated is passed upwardly through the bed with such a fast flow rate that the closely packed bed is lifted into the upper part of the respective vessel.

2. A method according to claim 1, in which the liquids for regenerating and washing are passed with a low rate of flow through the bed that is to be regenerated.

3. A method according to claim 1, in which the thickness of the bed is large as compared with its mean diameter.

4. A method according to claim 1, in which the washing liquid for the one bed is a part of the liquid treated by means of the other bed.